US012747755B2

(12) United States Patent
Allison et al.

(10) Patent No.: US 12,747,755 B2
(45) Date of Patent: Sep. 29, 2026

(54) BEARING CAGE WITH CIRCUMFERENTIAL LUBRICANT PASSAGES

(71) Applicant: AKTIEBOLAGET SKF, Gothenburg (SE)

(72) Inventors: Bryan D. Allison, Clymer, NY (US); Brian Larsen, Scottville, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 14 days.

(21) Appl. No.: 18/959,952

(22) Filed: Nov. 26, 2024

(65) Prior Publication Data

US 2026/0146651 A1 May 28, 2026

(51) Int. Cl.
*F16C 19/06* (2006.01)
*B33Y 80/00* (2015.01)
(Continued)

(52) U.S. Cl.
CPC .......... *F16C 33/6629* (2013.01); *F16C 19/06* (2013.01); *F16C 33/3856* (2013.01);
(Continued)

(58) Field of Classification Search
CPC .... F16C 19/06; F16C 33/3843; F16C 33/385; F16C 33/3856; F16C 33/414; F16C 33/416; F16C 33/6614; F16C 33/6629; F16C 33/6651; F16C 33/6681; F16C 2220/02; F16C 2220/04; F16C 2220/24; B33Y 80/00
See application file for complete search history.

(56) References Cited

U.S. PATENT DOCUMENTS 3,179,478 A * 4/1965 Readdy ............... F16C 33/3806 384/472

FOREIGN PATENT DOCUMENTS

DE 102016222029 A1 * 1/2018 .......... F16C 33/7893
DE 102018115766 A1 * 1/2019 .......... F16C 33/3843
(Continued)

OTHER PUBLICATIONS

Description_DE102016222029A1.*

*Primary Examiner* — Phillip A Johnson
(74) *Attorney, Agent, or Firm* — J-TEK LAW PLLC; Scott T. Wakeman; Mark A. Ussai

(57) ABSTRACT

A cage is provided for a bearing, the bearing including an inner body having an inner raceway surface, an outer body disposed about the inner body so as to define an annular space, the outer body having an outer raceway surface, and a plurality of rolling elements disposed within the annular space and rollable simultaneously upon the inner raceway surface and the outer raceway surface. The cage includes an annular body disposeable within the annular space between the inner body and the outer body, having a centerline and including a plurality of pockets spaced circumferentially about the centerline. Each pocket is configured to retain a separate one of the plurality of rolling elements. Further, a plurality of interior circumferential passages each extend circumferentially between a separate pair of adjacent pockets. The passages function to retain lubricant, particularly grease, and also enables displacement of lubricant/grease between the adjacent pockets.

11 Claims, 5 Drawing Sheets

(51) Int. Cl.
*F16C 33/38* (2006.01)
*F16C 33/66* (2006.01)

(52) U.S. Cl.
CPC .......... *F16C 33/3887* (2013.01); *B33Y 80/00* (2014.12); *F16C 2220/24* (2013.01)

(56) References Cited

FOREIGN PATENT DOCUMENTS

| | | | | | |
|---|---|---|---|---|---|
| EP | 2884128 | A1 | | 6/2015 | |
| GB | 2629799 | A | * | 11/2024 | .......... F16C 33/3806 |
| JP | 2012132536 | A | * | 7/2012 | .......... F16C 33/6614 |
| JP | 2016090053 | A | | 5/2016 | |

* cited by examiner

BEARING CAGE WITH CIRCUMFERENTIAL LUBRICANT PASSAGES

BACKGROUND OF THE INVENTION

The present invention relates to bearings, and more particularly to rolling element bearings having cages.

Rolling element bearings are well known and include an inner body having an inner raceway surface, an outer body having an outer raceway surface and a plurality of rolling elements disposed between and radially coupling the inner and outer bodies so as to rotatably couple an inner member, such as a shaft, etc., with an outer member, such as a housing, a wheel hub, etc. Certain rolling element bearings include a cage for maintaining a desired circumferential spacing between the rolling elements, which may be balls, cylinders, spheroids, etc. Specifically, the cage includes a plurality of circumferentially spaced pockets, which may be entirely enclosed or have an open axial side, and each rolling element is disposed within a separate one of the pockets.

Typically, a lubricant such as oil or grease is provided within the space between the inner and outer bodies of the bearing in order to reduce friction between the points of contact between the rolling elements and the raceway surfaces, as well as between the rolling elements and the surfaces of the cage pockets. However, in certain applications such as semiconductor manufacturing, the type of lubricant is generally restricted to specific types of grease which can withstand vacuum environments. Also, the amount of such grease is limited in order to avoid the grease from passing out of the bearing and causing contamination. Normally, a bearing typically has 30% to 40% of the free volume between the inner and outer bodies filled with grease, but in these applications, the amount of grease is limited to about 10% of the free volume.

As a result, when the limited amount of grease breaks down, the grease loses the ability to adequately lubricate the contact points until friction torque becomes excessive and/or the locating accuracy of the bearing is reduced to below acceptable levels. At either point, the bearing is typically replaced.

SUMMARY OF THE INVENTION

In an aspect, the present invention is a cage for a bearing, the bearing including an inner body having an inner raceway surface, an outer body disposed about the inner body so as to define an annular space, the outer body having an outer raceway surface, and a plurality of rolling elements disposed within the annular space and rollable simultaneously upon the inner raceway surface and the outer raceway surface. The cage comprises an annular body disposeable within the annular space between the inner body and the outer body, having a centerline and including a plurality of pockets spaced circumferentially about the centerline. Each pocket is configured to retain a separate one of the plurality of rolling elements. Further, the cage includes a plurality of interior circumferential passages, each one of the plurality of circumferential passages extending circumferentially between a separate pair of adjacent pockets.

Preferably, each one of the plurality of circumferential passages is configured to retain lubricant, most preferably grease. At least some of the plurality of circumferential passages are each preferably configured to enable displacement of lubricant between the pair of adjacent pockets; in other words, at least some of the plurality of circumferential passages are each configured to fluidly connect the pair of adjacent pockets. Further, the annular body has an inner circumferential surface and an outer circumferential surface and each one of the plurality of circumferential passages is disposed radially between and spaced radially apart from each one of the inner circumferential surface and the outer circumferential surface. Also, each one of the plurality of circumferential passages is bounded by an enclosed cylindrical surface extending circumferentially between the pair of adjacent pockets.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
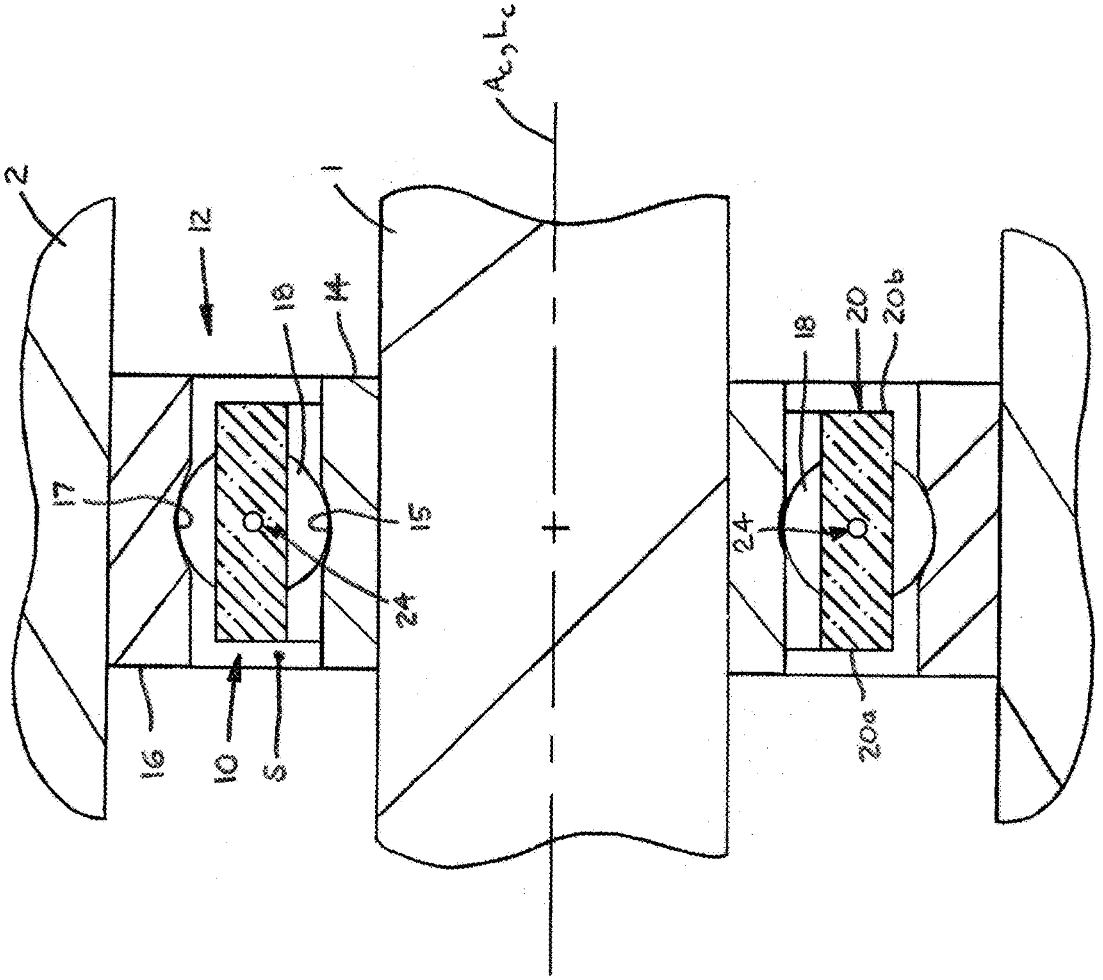
FIG. 1 is a broken-away, axial cross-sectional view of a bearing with a cage having circumferential passages in accordance with the present invention, shown mounted between a shaft and a housing.
Figure 2:
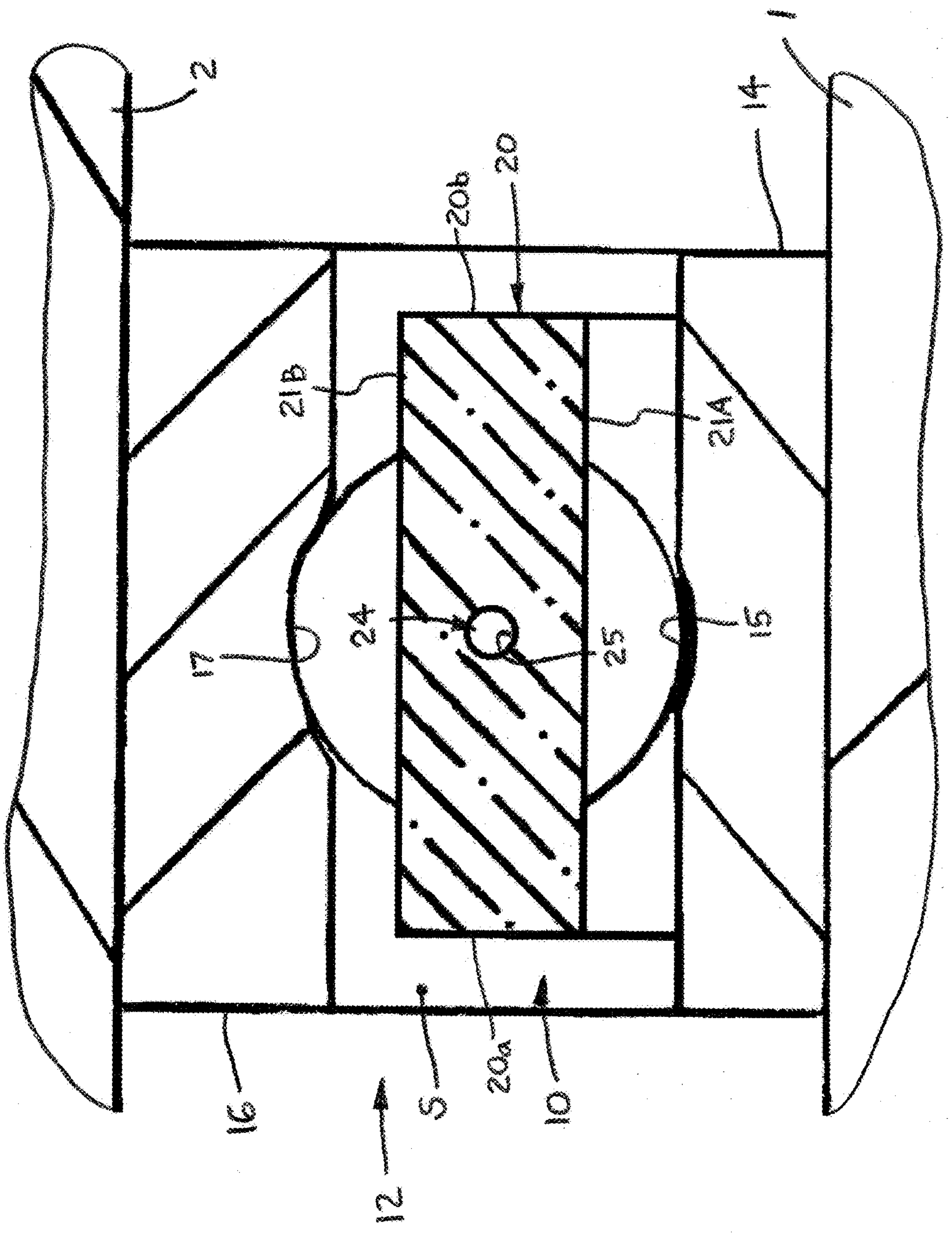
FIG. 2 is a broken-away, enlarged view of an upper portion of FIG. 1.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description.

Referring now to the drawings in detail, wherein like numbers are used to indicate like elements throughout, there is shown in FIGS. 1-6 a cage 10 for a bearing 12 that is preferably used in a vacuum or other specialty environment, in particular for microchip manufacturing. The bearing 12 includes an inner body 14 having a central axis $A_C$ and an inner raceway surface 15 and an outer body 16 disposed about the inner body 14 so as to define an interior annular space S, the outer body 16 having an outer raceway surface 17, at least one of the inner and outer bodies 14, 16 being rotatable about the central axis $A_C$. Preferably, the inner and outer bodies 14, 16 are each formed as a ring, but one or both may be formed in any other appropriate manner, such as a hub, a sleeve, a housing, etc., the inner body/ring 14 being installed about an inner member 1, such as a shaft, and the outer body/ring 16 being installed within an outer member 2, such as a housing. Further, a plurality of rolling elements 18 are disposed within the annular space S and are each rollable simultaneously upon the inner raceway surface 15 and the outer raceway surface 17. The rolling elements 18 are preferably balls as depicted, but may be cylindrical rollers, tapered rollers, spherical rollers, needles, or any other type of rolling element.

The cage 10 comprises an annular body 20 disposeable within the annular space S between the inner body 14 and the outer body 16, the body 20 having a centerline $L_C$, an inner circumferential surface 21A, an opposing outer circumferential surface 21B and first and second opposing axial ends 20*a*, 20*b*, respectively. The body 20 includes a plurality of pockets 22 spaced circumferentially about the centerline $A_C$, each pocket 22 being configured to retain a separate one of the plurality of rolling elements 18. Each one of the plurality of pockets 22 has a geometric center (not indicated) and is bounded by a radial surface 23 extending at least partially around the center.

Further, the cage body 20 also includes a plurality of interior circumferential passages 24, each one of the plurality of circumferential passages 24 extending circumferentially between a separate pair of adjacent pockets 22. Each one of the plurality of circumferential passages 24 is configured to retain lubricant, preferably grease, such that the grease is available for lubricating the points of contact between each pocket 22 and the rolling element 18 contained therein, as well as being transferred to the raceways 15, 17 to lubricate the points of contact between the rolling elements 18 and the raceways 15, 17.

Specifically, when the bearing 12 is lubricated prior to use in a particular application or relubricated in a service operation, a certain quantity of the lubricant preferably becomes disposed within the passages 24. The lubricant is thus stored within the passages 24 and is available for use after the breakdown or dissipation of lubricant applied directly to points of contact between the cage 10 and the rolling elements 18 or between the rolling elements 18 and the raceways 15, 17. Therefore, forming the cage 10 with the circumferential passages 24 both prolongs the service time between required relubrication of the bearing 12 and extends the overall life of the bearing 12.

Preferably, one circumferential passage 24 extends between every pair of adjacent pockets 22, but the cage 10 may be formed such that the passages 24 extend between only certain pockets 22. Furthermore, at least some and preferably all of the plurality of circumferential passages 24 are each configured to enable displacement of lubricant between the pair of adjacent pockets 22. In other words, at least some of the circumferential passages 24 are configured to fluidly connect the pair of adjacent pockets 22. As such, when grease or other lubricant is lacking within one pocket 22, the grease/lubricant can be transferred or transported from one pocket 22 to an adjacent pocket 22 by means of the circumferential passages 24.

Figure 5:
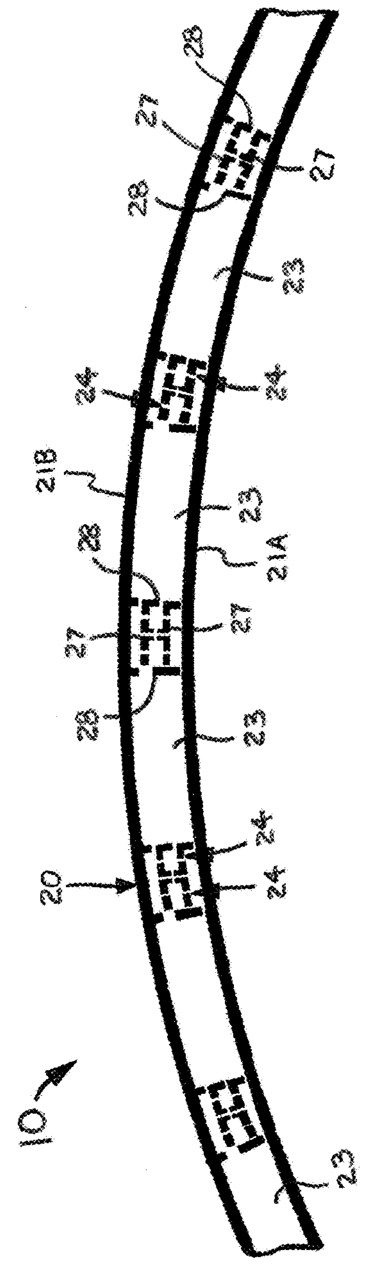
FIG. 5 is another broken-away, side plan view of the present cage, showing blind circumferential passages.
Figure 6:
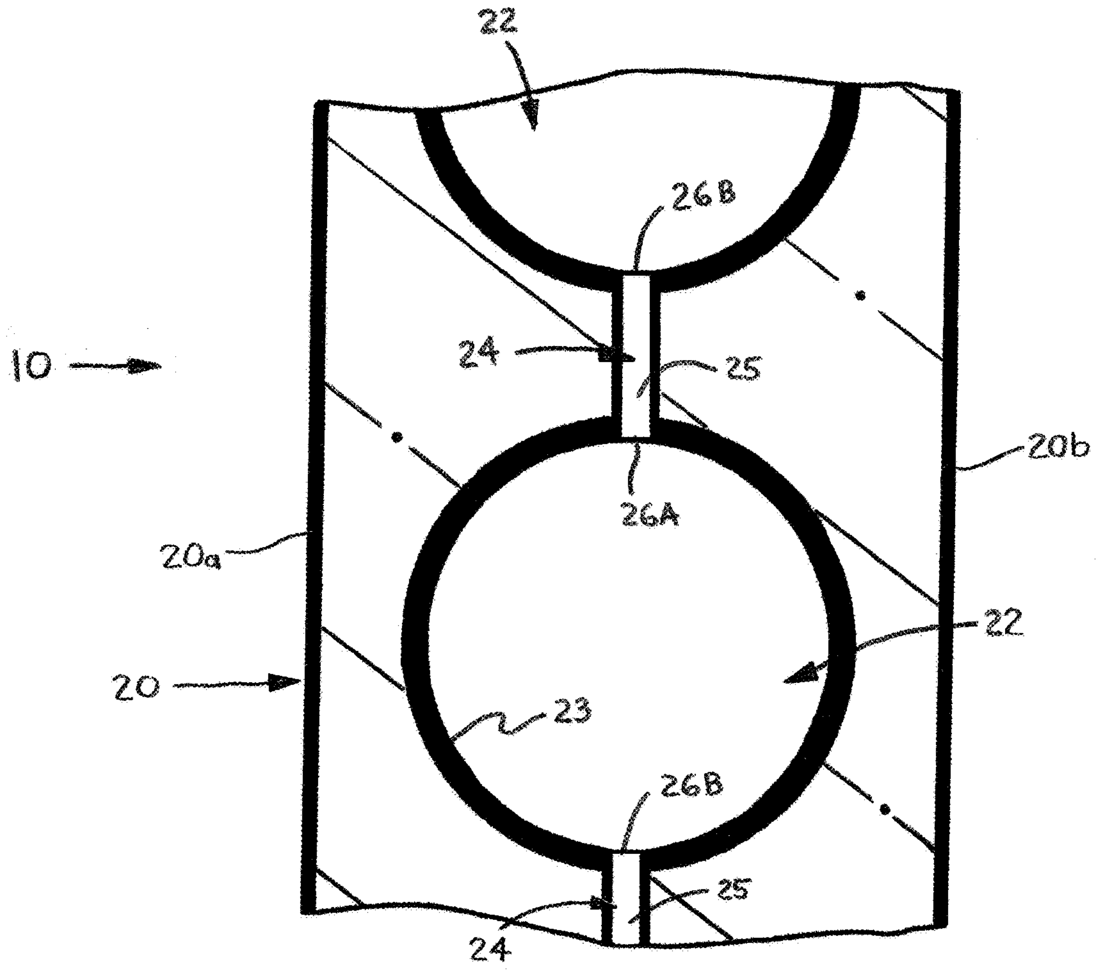
FIG. 6 is a broken-away, enlarged circumferential cross-sectional view of the cage, showing two pockets and two circumferential passages.

Referring specifically to FIG. 5, alternatively, one or more of the circumferential passages 24 may only extend partially between a pair of adjacent pockets 22, such that the passage 24 is fluidly connected with one pocket 22 and has an end 27 spaced circumferentially from the adjacent pocket 22. As a result, such a "blind" passage 24 functions to retain grease that is available for the connected pocket 22, but does not enable grease to be transferred between the adjacent pockets 22.

Figure 3:
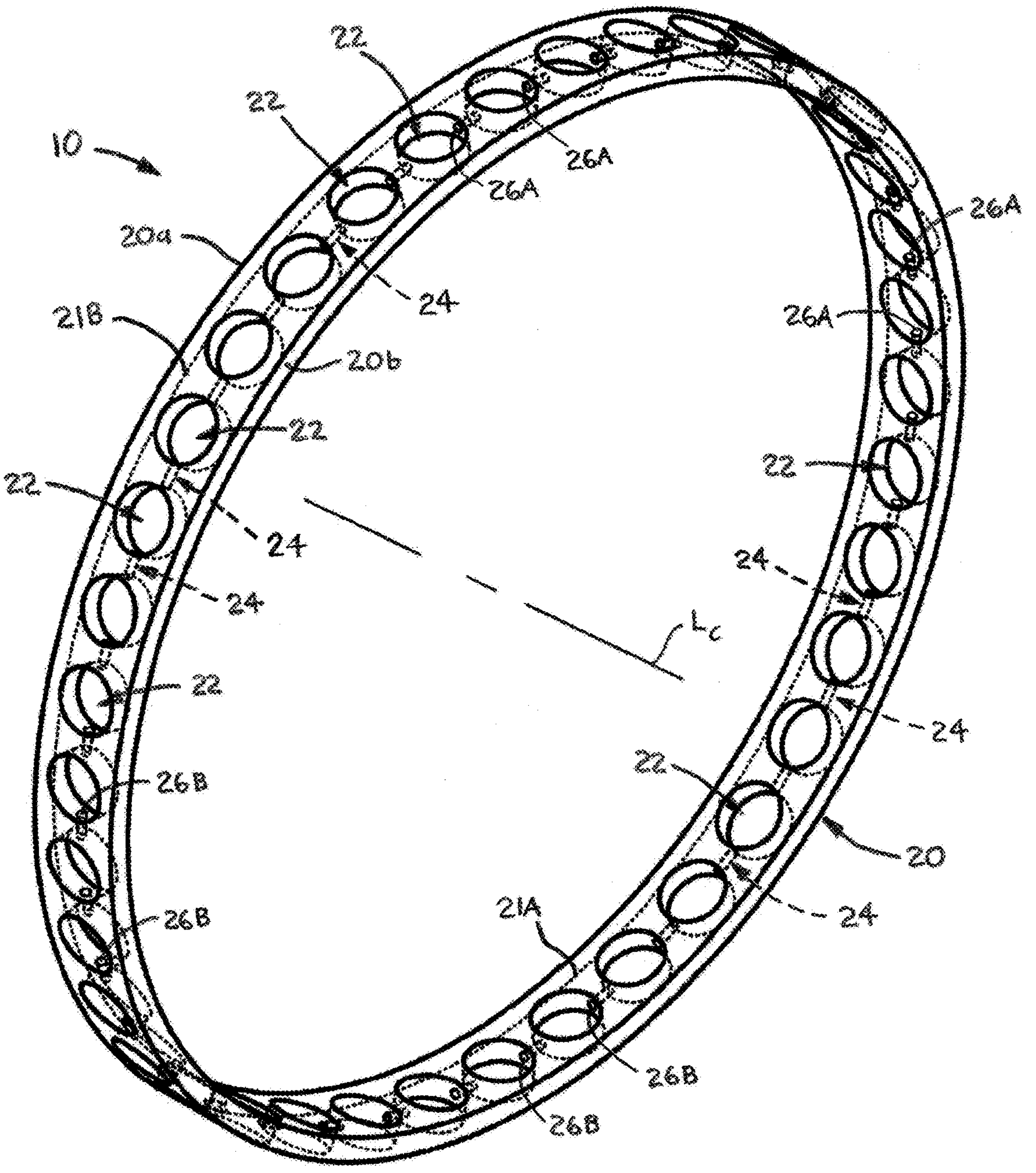
FIG. 3 is a perspective view of the present cage.
Figure 4:
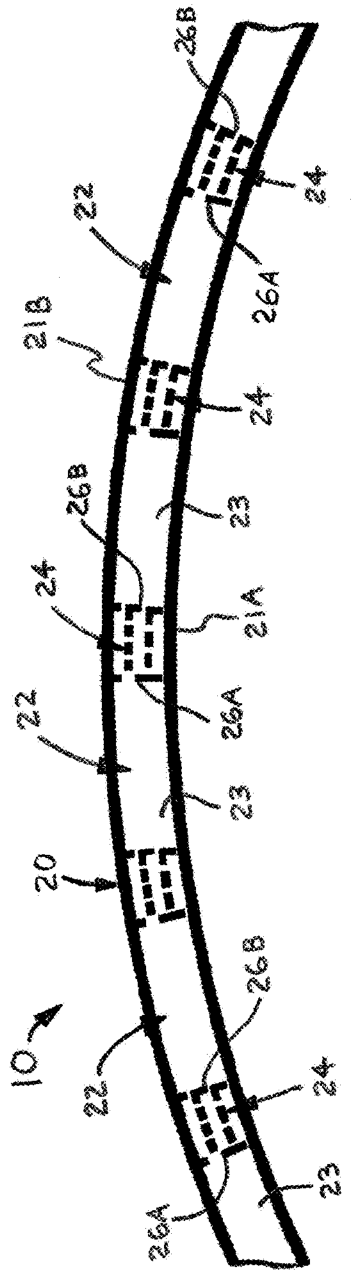
FIG. 4 is a broken-away, side plan view of the present cage.

Referring to FIGS. 3-5, each one of the plurality of circumferential passages 24 is disposed radially between and spaced radially apart from each one of the inner circumferential surface 21A and the outer circumferential surface 21B of the annular body 20. As such, each passage 24 is entirely enclosed within the body 20, and is thus fluidly isolated or separated from the inner and outer surfaces 21A, 21B of the body 20. Preferably, each circumferential passage 24 is bounded by an enclosed cylindrical surface 25, which is preferably circular cylindrical, that extends circumferentially between the pair of adjacent pockets 22.

More specifically, each passage 24 has at least one opening fluidly connected with one pocket 22 of the pair of adjacent pockets 22. With the preferred passages 24 fluidly connecting the adjacent pockets 22, each passage 24 has a first opening 26A fluidly connected with one pocket 22 of the pair of adjacent pockets 22 and a second opening 26B fluidly connected with the other adjacent pocket 22. The first opening 26A extends through the radial surface 23 of the one pocket 22 and the second opening 26B extends through the radial surface 23 of the other adjacent pocket 22. However, with any passage 24 formed as a blind passage as described above, the passage 24 only has a single opening 28 extending through the radial surface 23 of the connected pocket 22, as indicated in FIG. 5.

Furthermore, the cage 10 is preferably formed of a polymeric material in a molding process or by additive manufacturing. However, the cage 10 may be formed of any other appropriate material and/or manufacturing process, such as for example, being formed of a metallic material in a stamping process.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A cage for a bearing, the bearing including an inner body having an inner raceway surface, an outer body disposed about the inner body so as to define an annular space, the outer body having an outer raceway surface, and a plurality of rolling elements disposed within the annular space and rollable simultaneously upon the inner raceway surface and the outer raceway surface, the cage comprising:

an annular body disposeable within the annular space between the inner body and the outer body, having a centerline and including a plurality of pockets spaced circumferentially about the centerline, each pocket being configured to retain a separate one of the plurality of rolling elements and being bounded by a radial surface extending at least partially about a center of the pocket, and a plurality of interior circumferential passages, each one of the plurality of circumferential passages extending circumferentially between a separate pair of adjacent pockets and being bounded by a single enclosed cylindrical surface extending circumferentially and continuously between the pair of adjacent pockets and including a first opening through the radial surface of one of the pair of adjacent pockets and a second opening through the radial surface of the other one of the pair of adjacent pockets such that each circumferential passage directly fluidly connects the pair of adjacent pockets and is only fluidly connected with the pair of pockets.

2. The cage as recited in claim 1, wherein each one of the plurality of circumferential passages is configured to retain lubricant.

3. The cage as recited in claim 1, wherein at least some of the plurality of circumferential passages are each configured to enable displacement of lubricant between one pair of adjacent pockets.

4. The cage as recited in claim 1, wherein the annular body has an inner circumferential surface and an outer circumferential surface, each one of the plurality of circumferential passages being disposed radially between and spaced radially apart from each one of the inner circumferential surface and the outer circumferential surface.

5. The cage as recited in claim 1, wherein a separate one of the plurality of circumferential passages extends between every pair of adjacent pockets of the plurality of pockets.

6. The cage as recited in claim 1, wherein the annular body is formed of a polymeric material in a molding process or by additive manufacturing.

7. A bearing comprising:

an inner body having an inner raceway surface;

an outer body disposed about the inner body so as to define an annular space, the outer body having an outer raceway surface, a plurality of rolling elements disposed within the annular space and rollable simultaneously upon the inner raceway surface and the outer raceway surface; and a cage disposed within the annular space, having a centerline and including a plurality of pockets spaced circumferentially about the centerline, each one of the plurality of rolling elements being disposed within a separate one of the plurality of pockets and being bounded by a radial surface extending at least partially about a center of the pocket, and a plurality of interior circumferential passages, each one of the plurality of circumferential passages extending circumferentially between a separate pair of adjacent pockets and being bounded by a single enclosed cylindrical surface extending circumferentially and continuously between the pair of adjacent pockets and including a first opening through the radial surface of one of the pair of adjacent pockets and a second opening through the radial surface of the other one of the pair of adjacent pockets such that each circumferential passage directly fluidly connects the pair of adjacent pockets and is only fluidly connected with the pair of pockets.

8. The bearing as recited in claim 7, further comprising a lubricant disposed within the annular space, each one of the plurality of circumferential passages being configured to retain a separate portion of the lubricant.

9. The bearing as recited in claim 8, wherein at least some of the plurality of circumferential passages are each configured to enable displacement of lubricant between one pair of adjacent pockets.

10. The bearing as recited in claim 7, wherein the annular body has an inner circumferential surface and an outer circumferential surface, each one of the plurality of circumferential passages being disposed radially between and spaced radially apart from each one of the inner circumferential surface and the outer circumferential surface.

11. The bearing as recited in claim 7, wherein a separate one of the plurality of circumferential passages extends between every pair of adjacent pockets of the plurality of pockets.

* * * * *